Jan. 13, 1970  A. J. COUNTRYMAN  3,489,076
AUTOMATIC STRAPPING APPARATUS
Filed May 20, 1968  8 Sheets-Sheet 1

INVENTOR.
ALBERT J. COUNTRYMAN
BY Richard H. Smith
ATTORNEY

United States Patent Office 3,489,076
Patented Jan. 13, 1970

3,489,076
AUTOMATIC STRAPPING APPARATUS
Albert J. Countryman, Mohawk, N.Y., assignor, by mesne assignments, to Ty-Lok Assembly Systems, Inc., Ilion, N.Y., a corporation of New York
Filed May 20, 1968, Ser. No. 730,227
Int. Cl. B65b 13/04; G05d 15/00
U.S. Cl. 100—4            4 Claims

ABSTRACT OF THE DISCLOSURE

Automatic cable strapping is effected by feeding a strap through a closure member having a double detenting capability, around a closed-loop guide member surrounding a bundle of cables and back into the closure. Reverse feeding of the strap then draws it tightly about the cables, whereupon the strap is automatically severed from the supply coil and the assemblage ejected. A first detent in the closure grips the strap during tightening and a second detent combines with the first to securely lock the strap after tightening. Four types of closures are disclosed, two of which are completely non-metallic.

BACKGROUND OF THE INVENTION

This invention relates to automatic strapping and, more particularly, to an improved apparatus for completely automatically feeding a binding strap around an object to be bound, and securing the strap in a tight permanent wrap thereabout. The apparatus finds particular utility in the cable harnessing art wherein a group of electrical wires is strapped together into a single unitary cable.

Up until now, cable harnessing such as is practiced in the electrical industry, has consisted primarily of manual operations. The group of wires to be bound together in a cable are assembled in a group on a special jig or fixture and then an operator manually ties the group into a unitary cable with pieces of binding cord.

Some semi-automatic devices have been introduced but each of these has been found to possess disadvantages and limitations. For example, one type of semi-automatic device contains a supply of strap material and a supply of strap closures (the devices which secure the ends of the strap together after it has been tightly bound about the cable). An operator must draw a length of strap out of the device manually, apply it about the cable and insert the end of the strap into a closure. Thereafter, the operator manually draws the loop of strap closed as tightly about the cable as strength permits. Then, as the strap is held taut a series of buttons and levers is manually manipulated to secure the closure and sever the looped and secured portion of strap from the strap supply. The difficulty with this device is that it requires a fairly high degree of operator strength and stamina and calls for more than a moderate amount of skill and training to enable an operator to become proficient and remain proficient at its use. Also, because of the manner in which the strapping is wrapped and secured around the cable, the sharp severed ends of the straps are left projecting outwardly at right angles from the cable, which has been found to be a safety hazard for the operator and for persons subsequently handling the strapped cable.

Another type of cable strapping arrangement in the prior art is one where individual precut straps are integrally provided with a closure at one end. The closure includes an aperture for receiving the other end of the strap after it has been looped about the cable and further includes some type of anti-reverse detent which enables the free end of the strap to be pulled through the closure until the strap is looped tightly about the cable, whereupon the detent keeps the whole assemblage tight. This type of strap can be installed manually or with the aid of a hand tool enabling the formation of a tighter wrap and facilitating the cutting off of the protruding, unused end of the strap. The limitation of this type of device is that it results in a high degree of strap wastage and requires stocking and handling of different sizes of straps for different cable diameters.

OBJECTS AND SUMMARY OF THE INVENTION

It is therefore an object of the invention to provide an improved, fully automatic strapping apparatus.

Another object is to provide an improved strapping apparatus which conserves the amount of strapping material used.

Still another object is to provide an improved strap and strap closure configuration which simplifies the mechanics of securing and installing the strap.

Yet another object is to provide an improved, entirely non-metallic strap and closure for use in an automatic strapping process.

In accordance with a first aspect of the invention, automatic strapping is performed by feeding a portion of strapping material into a guide means which guides the end of the strap through a closure, around the object to be strapped and back into the closure again. After the strap has been reinserted into the closure, strap feeding is reversed and the strap is pulled taut around the object. When the desired degree of tightness is achieved, an automatically actuated knife severs the strap from the length of strap supply and the closure from the closure supply, freeing the strapped assemblage.

In accordance with another aspect of the invention, a unique closure member, separate from the strap, is provided with a first detenting capability which is activated automatically upon insertion of the strap in the closure for the second time during the strapping process, whereupon reverse feeding of the strap causes the strap loop to close upon the object to be bound. Second detent means in the closure automatically lock the strap loop after the same has been drawn tight. In two of the four closure embodiments hereinafter described in detail this double detenting capability is fully implemented in a non-metallic structure.

These and other objects, features and advantages will be made apparent by the following detailed description of preferred embodiments of the invention, the description being supplemented by drawings as follows.

DETAILED DESCRIPTION

Figure 1:
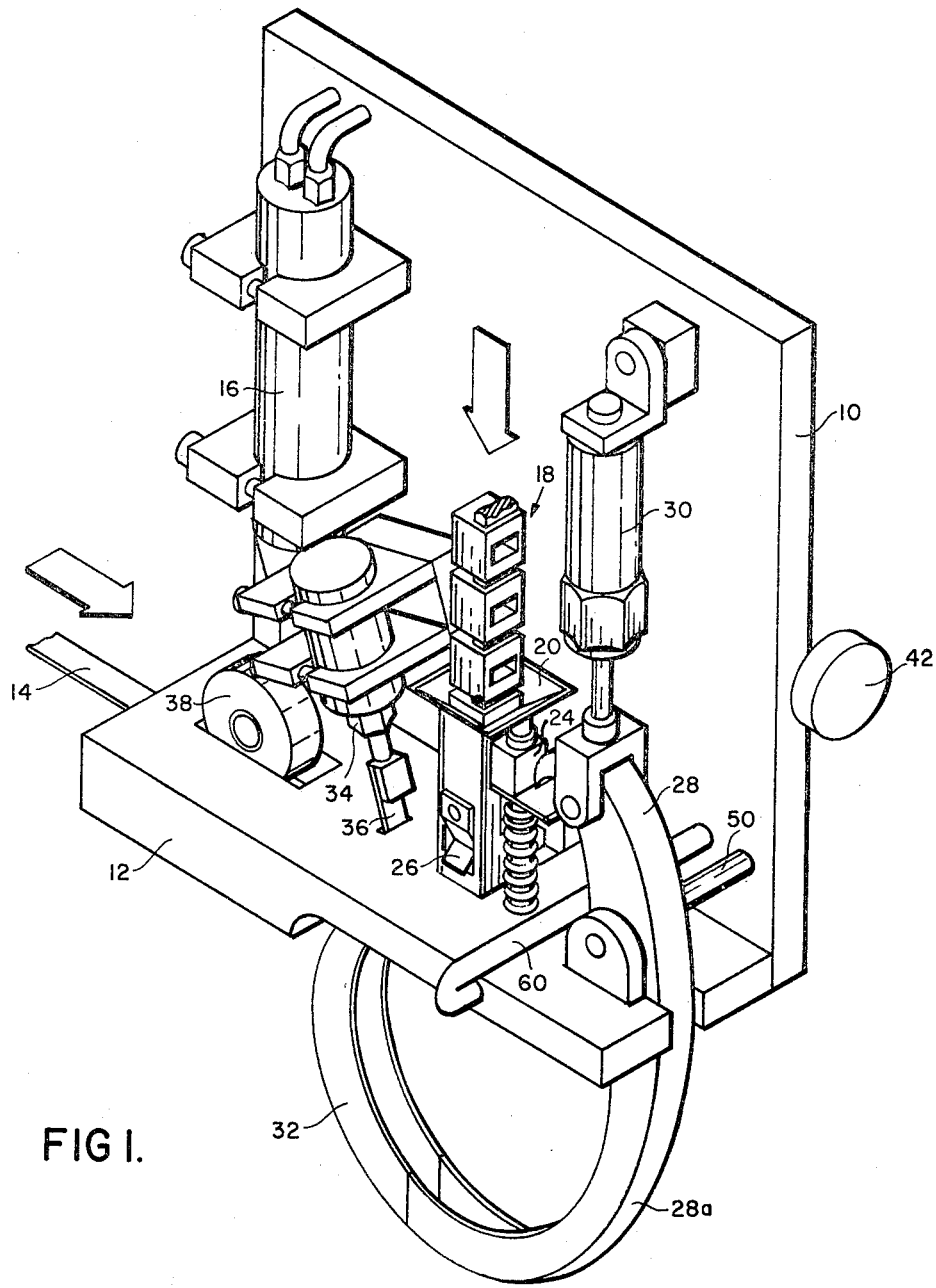
FIG. 1 is a perspective view showing a preferred embodiment of cable strapping apparatus in accordance with the invention.

Referring to FIG. 1 a preferred embodiment of the automatic strapping apparatus of the invention is hereinafter described. The operating elements of the apparatus are mounted by two basic support members, a backplate 10 and bedplate 12. Feeding of the strapping material 14 from a supply coil (not shown) is accomplished by a reversible air motor 16 mounted to backplate 10 and having a feed roll 38 positioned in an aperture in bedplate 12 for contact with the strap 14. The strap is fed through a channel inside the bedplate into a closed-loop guide member including a pair of channel members 28a and 32. Segment 28a is part of a pivotable jaw member 28 which is pivoted on a shaft 50 by a double acting air cylinder 30 mounted on backplate 10.

A string of inter-connected closure members 18 supplied from an overhead supply coil (not shown) feeds downwardly into a rectangular funnel 20 which serves to guide and maintain the closures in a proper position for the strapping operation. At the end of each strapping cycle the tip of jaw member 28 is driven by cylinder 30 downwardly and causes a spring loaded feed pawl 24 to feed the string of closures downwardly to place a new closure into position at the base of funnel 20. A pair of spring detent fingers 26 (one on each side of funnel 20) serve to hold the closures in proper position after the downward feeding by member 24.

Another double acting air cylinder 34 is mounted on backplate 10 to control a clearance finger 36 which during certain portions of the strapping cycle is interjected into the path of the strap for purposes described subsequently.

Figure 2:
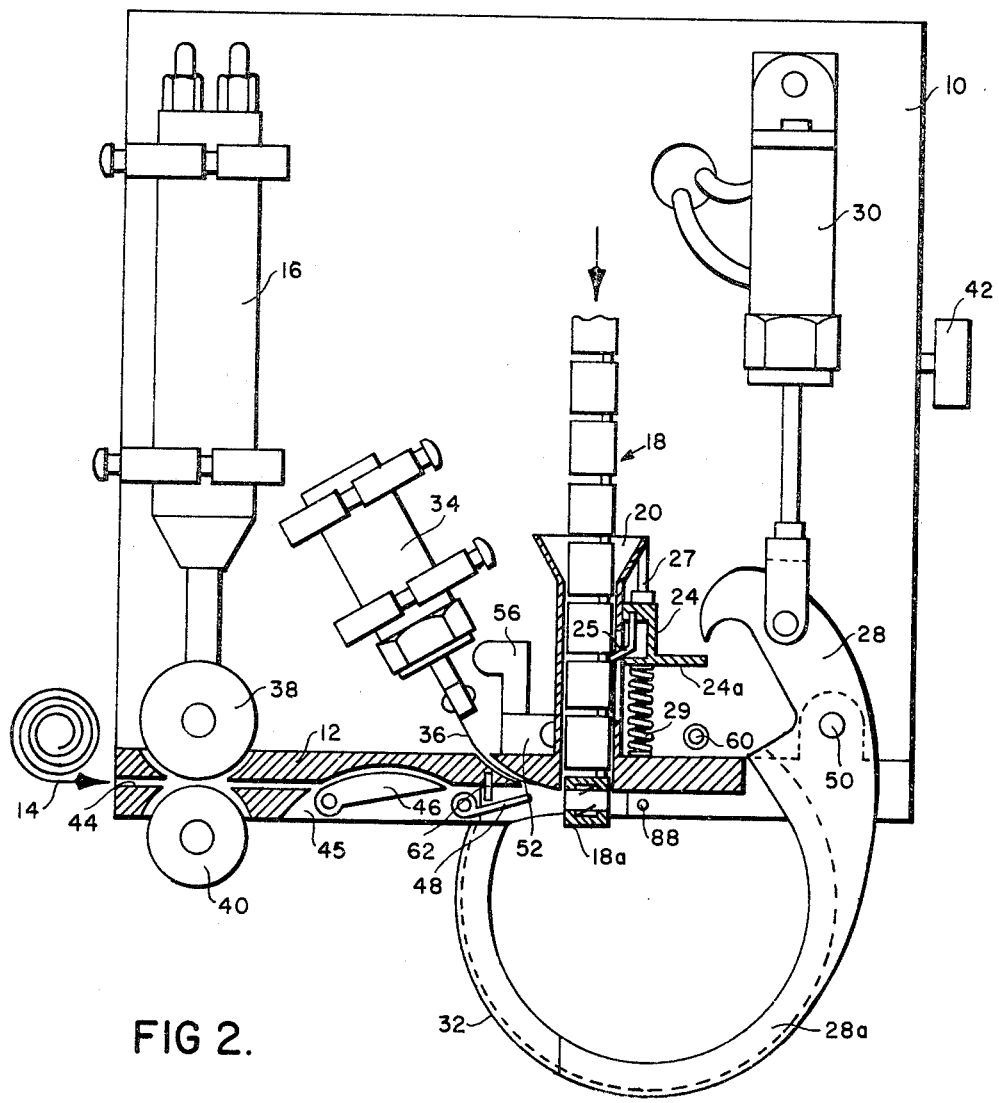
FIG. 2 is a partially sectioned front elevational view of the apparatus of FIG. 1.

FIG. 2 illustrates the strap feeding and closure positioning elements in greater detail. There, it can be seen that feed roll 38 cooperates with a pressure roll 40 to feed the strap rightwardly along an input channel 44 in bedplate 12. From the input channel the strap enters a slotted portion 45 on the underside of bedplate 12 whereupon the strap feeds over the top of a tension control arm 46 and into the region of the closed-loop guide member formed by the curved channel segments 28a and 32. Preferably, the direction of coiling of the roll of strap supply is counterclockwise as schematically illustrated in FIG. 2. This gives the end of the strap an inherent tendency to curve upwards as it traverses the strap path. This is helpful since it keeps the strap in contact with the various guide surfaces along the path, preventing premature blocking off of detection nozzles 88 as the strap moves through the closure the first time during the cycle.

In preparation for the strapping cycle the lower closure 18a has been positioned as shown in FIG. 2 and cylinder 30 has acted upwardly to close jaw 28 and allow closure feed pawl 25 to be returned by spring 29 to its upward position on guide shaft 27 for the next feeding operation. As will be described in greater detail, strapping is effected by feed roll 38 driving the end of the strap rightwardly through the center aperture of closure 18a from left to right and around the inside of channel members 28a and 32 until the end of the strap is reinserted in and passes through closure 18a a second time. Thereafter, knife blades project through slots adjacent the strap and bottom closure to sever the strap and closure from their respective supplies whereupon the strapped assemblage is released for removal from the machine.

Figure 8A:
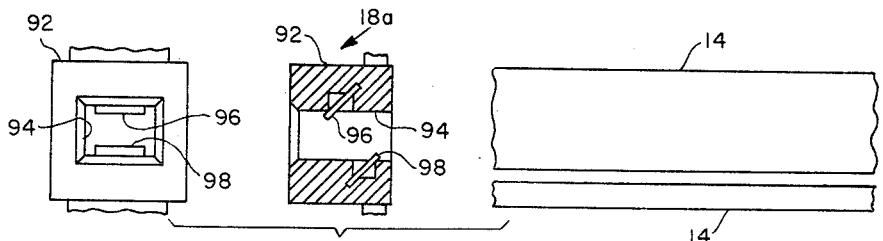
FIGS. 8a, 8b, 8c and 8d are various elevational and sectional views showing four different embodiments of closures and straps which are usable in the automatic strapping apparatus of the invention.

Closure member 18a is shown in greater detail in FIG. 8a. The closure comprises a rectangular block 92 having a central aperture 94. As shown in the center section, a pair of detent fingers 96 and 98, constructed preferably of spring steel, are imbedded in the block and project at an angle into the aperture 94. Finger 98 prevents right-to-left movement of the reinserted portion of the strap through the closure and finger 96 prevents left-to-right movement of the strap with respect to the closure. The height of aperture 94 is sufficient to admit a double layer of strap 14. Strap 14 is a plain strip of rectangular cross-section.

Figure 4:
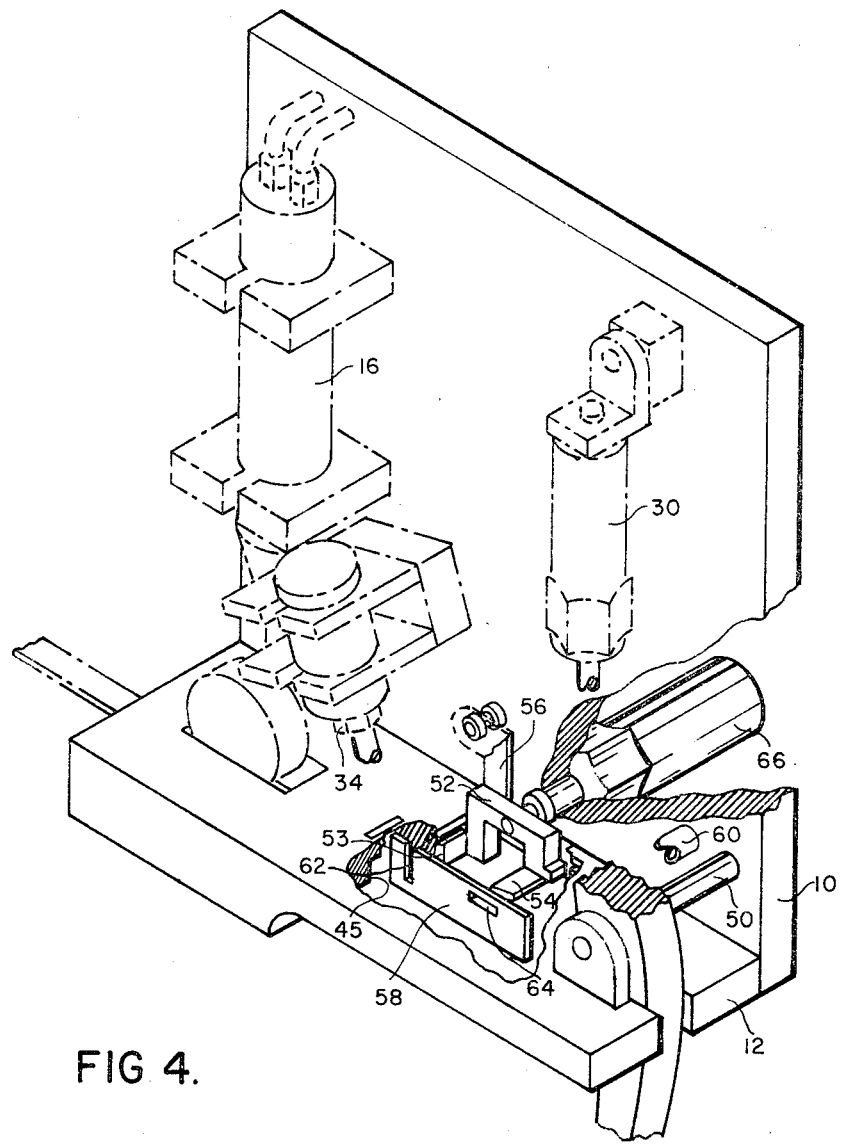
FIG. 4 is a perspective view, partially cut away, of the apparatus of FIG. 1 showing the details of the strap and closure cutting mechanism.

FIG. 4 shows the detail of the strap and closure cutting mechanism. A double acting air cylinder 66 mounted behind backplate 10 has an actuating rod which projects through the backplate and into a square cut-out in bedplate 12. Mounted on the end of the actuator rod is an inverted U-shaped support member 52 which carries a vertically oriented cutting blade 53 and a horizontal cutting blade 54. A pair of guide ears are provided on the sides of member 52 and guide in slots provided in the side walls of the bedplate cut-out. A plate 58 which defines the side wall of the strap guide slot 45 has a vertical aperture 62 and a horizontal aperture 64 for admitting the knife blades into the strap channel. Slot 64 is positioned in exact alignment with the separation between the lower closure member 18a (FIG. 2) and the closure immediately above it. Blade 54 thus severs the thin web of material separating those two closures. Slot 62, which is also shown in FIG. 2, permits the entry of blade 53 into the guide channel such that the strap is severed just to the left of the closure. Blade 54 is longer than blade 53 so that the closure is severed before the strap.

Referring now to FIGS. 5a through 5d one full strapping cycle is hereinafter described. Prior to the start of the cycle, the state of the various components is the same as that in which they were left at the end of the previous cycle. In other words, clearance finger 36 is withdrawn upward out of the path of the strap, tension arm 46 is in its home position, and the end of strap 14 is poised to enter the closed-loop strap guide (see FIG. 5d). Also, jaw 28 is in its fully opened position and the bottom closure is held in readiness to receive the end of the strap.

Figure 5A:
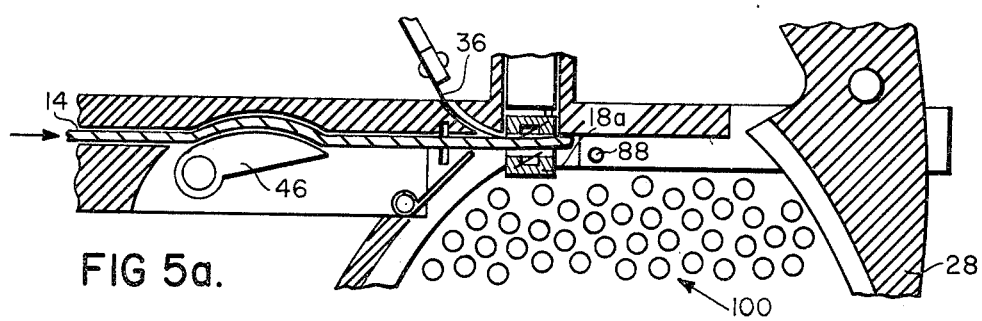
FIGS. 5a, 5b, 5c and 5d are operational diagrams depicting four stages in a strapping cycle.
Figure 5B:
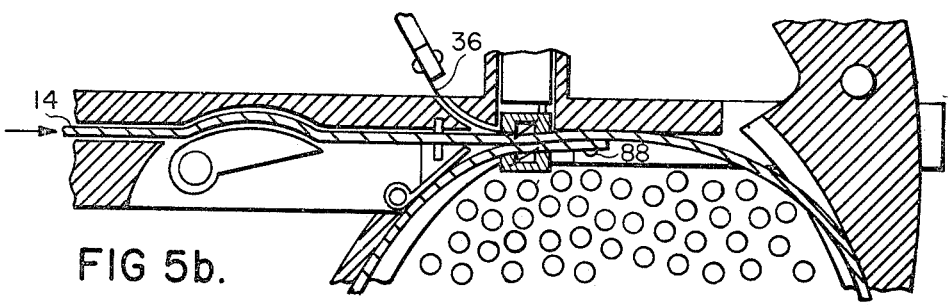
Figure 5C:
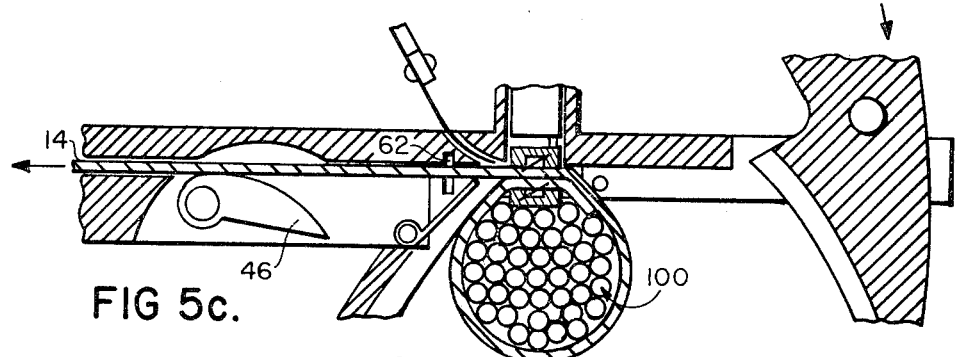

As the first step, the operator inserts a group of cables 100 (or other objects) to be strapped into the open jaw of the strap guide. Thereafter, the operator depresses the start button and the first action that occurs is closure of the jaw 28. As soon as the jaw is closed, clearance finger 36 is projected into the path of the strap and the strap 14 concurrently begins feeding to the right into and through the closure 18a (FIG. 5a). This forward feeding of the strap continues until the strap feeds all the way around the closed-loop strap guide and returns upon itself to be reinserted through the closure (FIG. 5b). When the reinserted end of the strap passes the detection nozzle 88 the feed motor is reversed and at the same time clearance finger 36 is withdrawn from the strap path. This causes the strap to be reverse fed until it is drawn tightly about the cables 100 (FIG. 5c). The lower spring-steel detent in the closure prevents the end of the strap from being pulled out of the closure as the feed motor tensions strap 14 to achieve a tight wrap. Tensioning of the strap causes tension arm 46 to be rotated clockwise against its spring bias and when the tension reaches a predetermined level as measured by the extent of rotation of arm 46, the feed motor is stopped.

Figure 5D:
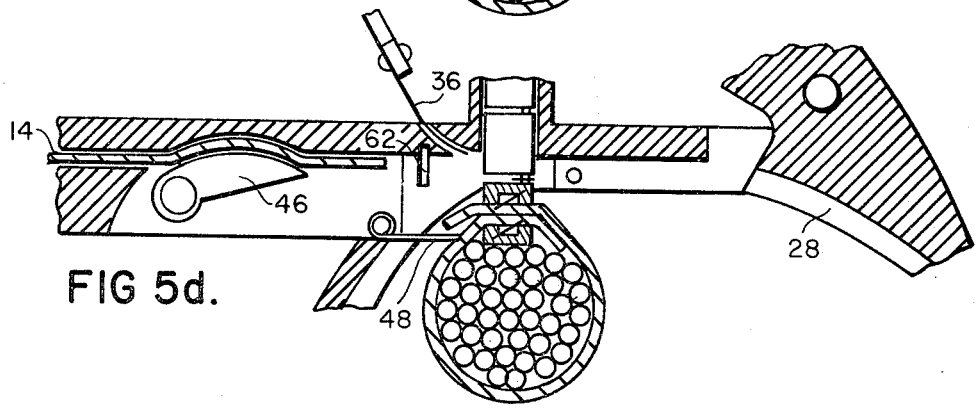

Next, the knife actuator operates to first sever the bottom closure from those above it and second to cut strap 14. The latter action releases the tension in the strap, permitting the spring bias on arm 46 to rotate it counterclockwise back to its home position. When the knife actuator has returned to its home position after the cuts have been performed, jaw 28 is opened and near the end of this action the supply of closures is fed downwardly one position by feed pawl 25 (FIG. 2) forcing the just-wrapped assembly out of the apparatus (FIG. 5d) and positioning the next closure into wrapping position. As shown in FIG. 5d the guide member 48 which forms the final portion of the closed-loop guide pivots clockwise when the wrapped assembly is ejected from the apparatus. This is required to free the loose end of the cut cable. Arm 48 is spring loaded about its pivot so that when the wrapped assembly has been removed the arm pivots back to its home position (FIG. 1) in readiness for the next wrapping cycle. As is apparent from FIG. 5d the strap encircling the cable bundle is secured in a very tight and permanent wrap. The two ends of the strap are gripped against release from the closure by the two anti-reverse detents in the closure.

Figure 3:
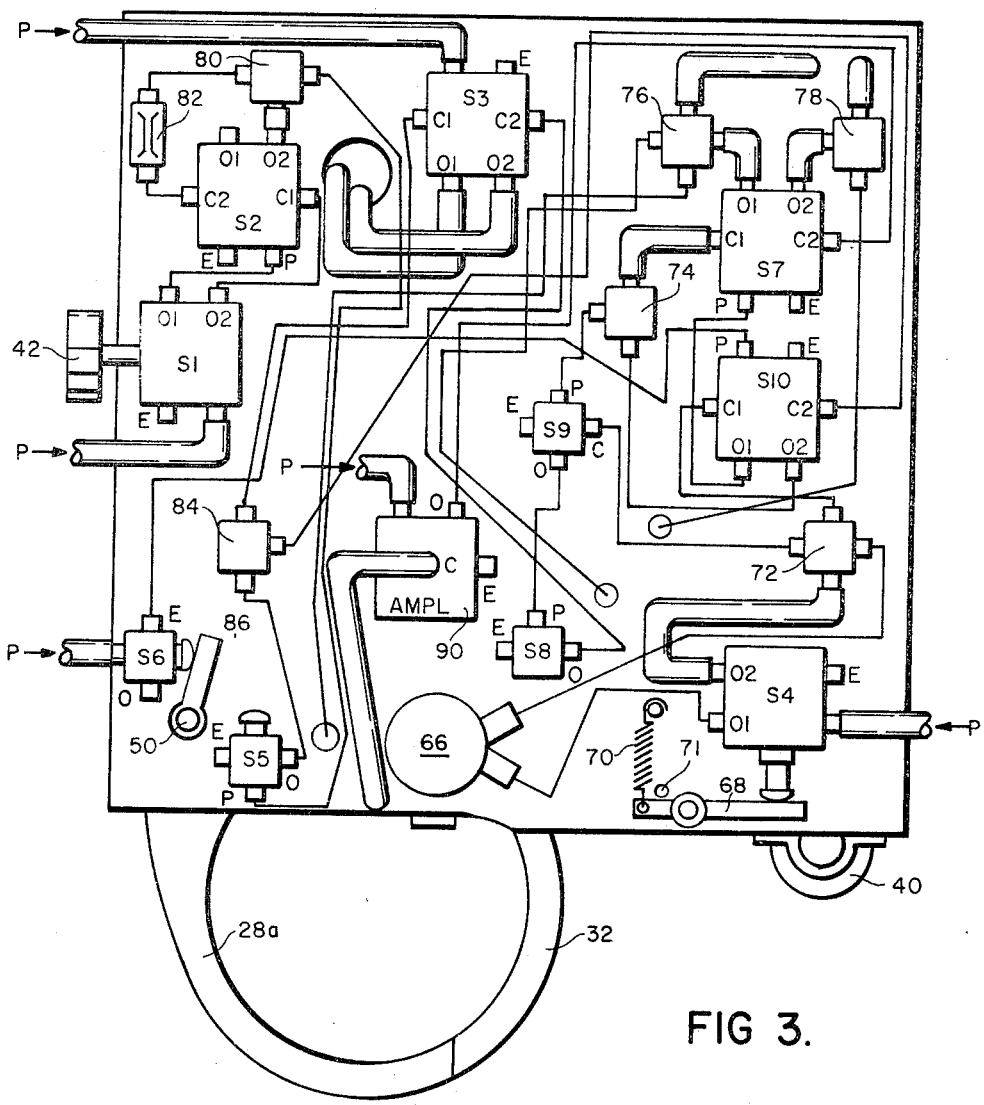
FIG. 3 is a rear elevational view, partially schematic, of the apparatus of FIG. 1.

In the apparatus as above described pneumatic power and control components operate to perform all motive and control functions. With the exception of the reversible air motor 16 and the double acting air cylinders 34 and 30 (FIG. 1), all the power and control elements are mounted on the back of backplate 10. The layout of these elements is shown in FIG. 3. To simplify and clarify FIG. 3, the majority of the penumatic conduits (air hoses) interconnecting the various elements are shown as single solid lines. Each such line represents one air hose.

The pneumatic control components consist of three-way valves S5, S6, S8 and S9, four-way valves S1, S2, S3, S4, S7 and S10, a fluidic amplifier 90, a plurality of junction conduits 72, 74, 76, 78, 80 and 84 and a restrictive conduit 82.

Each three-way valve such as S5 has one input port P, one output port O, an exhaust port E and a control actuator, which in the case of S5, S6, and S8 are manual push-rod actuators. In the case of valve S9 the control actuator is an air pilot actuator represented by input C which enables the switch to be controlled by application of air pressure thereto. The function of a three-way valve is to switch the output port O into communication with either the input port P or exhaust port E, depending on the state of the control actuator. In the cases of S5, S6, and S8 depression of the push-rod actuators connects port P to output O while release of the actuator permits an internal spring to switch the output O back to the exhaust port E. For switch S9, application of air pressure to control input C switches output port O to exhaust E while release of the control air pressure causes an internal spring to switch the valves to reconnect output O to input P. One type of three-way valve which is suitable for use with the invention is the "MAV–3" three-way valve sold by the Clippard Instrument Laboratory, Incorporated, of Cincinnati, Ohio. A Clippard "MPA–3" air pilot actuator is suitable for use as the input C to switch S9.

Each of the four-way valves S1, S2, S3, S4, S7 and S10 has two output ports O1 and O2, one input port P, and an exhaust port E. Control of these switches is accomplished either by a manual push-rod actuator as in the case of switches S1, and S4 or by a pair of air pilot actuators C1 and C2 as in the case of switches S2, S3, S7 and S10. For S1 and S4 depression of the push-rod actuator connects input port P to output port O1 and output port O2 to exhaust E while release of the actuator permits an internal spring to reverse the state of the switch, connecting P to O2 and E to O1. For the air pilot controlled four-way valves, application of pressure to the C1 input switches the valve so that input port P is connected to output port O1 and output port O2 is connected to exhaust E. The switch remains in this condition regardless of whether the pressure is removed from C1. As soon as pressure is applied to C2 the switch is reversed so that O2 is connected to P and O1 is connected to E. Similarly, the switch remains in this state until pressure is once again applied at C1. A suitable four-way valve for use in the instant invention is, for example, the Clippard "MAV–4" or "MAV–4D" four-way valve supplied either with a manual push-rod actuator or a pair of air pilot actuators such as the Clippard "MPA–3" actuator.

The amplifier 90 is a device which senses a slight drop in pressure at an input port C and in response thereto causes the higher pressure present at an input port P to be applied to output port O. Restoration of the pressure level at C causes output O to be reconnected to an exhaust port E. A suitable fluidic amplifier for use with the present invention is the "2010 Fluid-Amp Valve" available from Northeast Fluidics, Incorporated, of Bethany, Conn.

Restrictive conduit 82 is simply a chamber having an input, an output and a very narrow restriction connecting the two. As will become apparent subsequently, this component is used for delay purposes. The junction conduits 72, 74, 76, 78, 80 and 84 are hollow chambers with three or four outlet branches as shown.

A control arm 86 is connected to shaft 50 which supports the jaw member 28. Arm 86 operates to manipulate the three-way valves S5 and S6 such that when jaw 28 is closed the actuator of S6 is depressed and when the jaw 28 is fully opened the actuator of S5 is depressed. The push-rod actuator of S8 projects through backplate 10 and is manipulated by an arm 56 on knife support member 52 (FIG. 4). The push-rod actuator of S1 is manually operated by start button 42. The actuator of S4 is operated by an arm 68 which is connected to the pivot shaft of tension arm 46. Tension spring 70 biases arm 68 clockwise against a stop 71. During most of the cycle the actuator of S4 is non-depressed and tension arm 46 is in its uppermost home position (FIG. 5a). The input port P of switches S1, S3, S4, S6 and the fluidic amplifier are connected to a supply source of air pressure.

Figure 6:
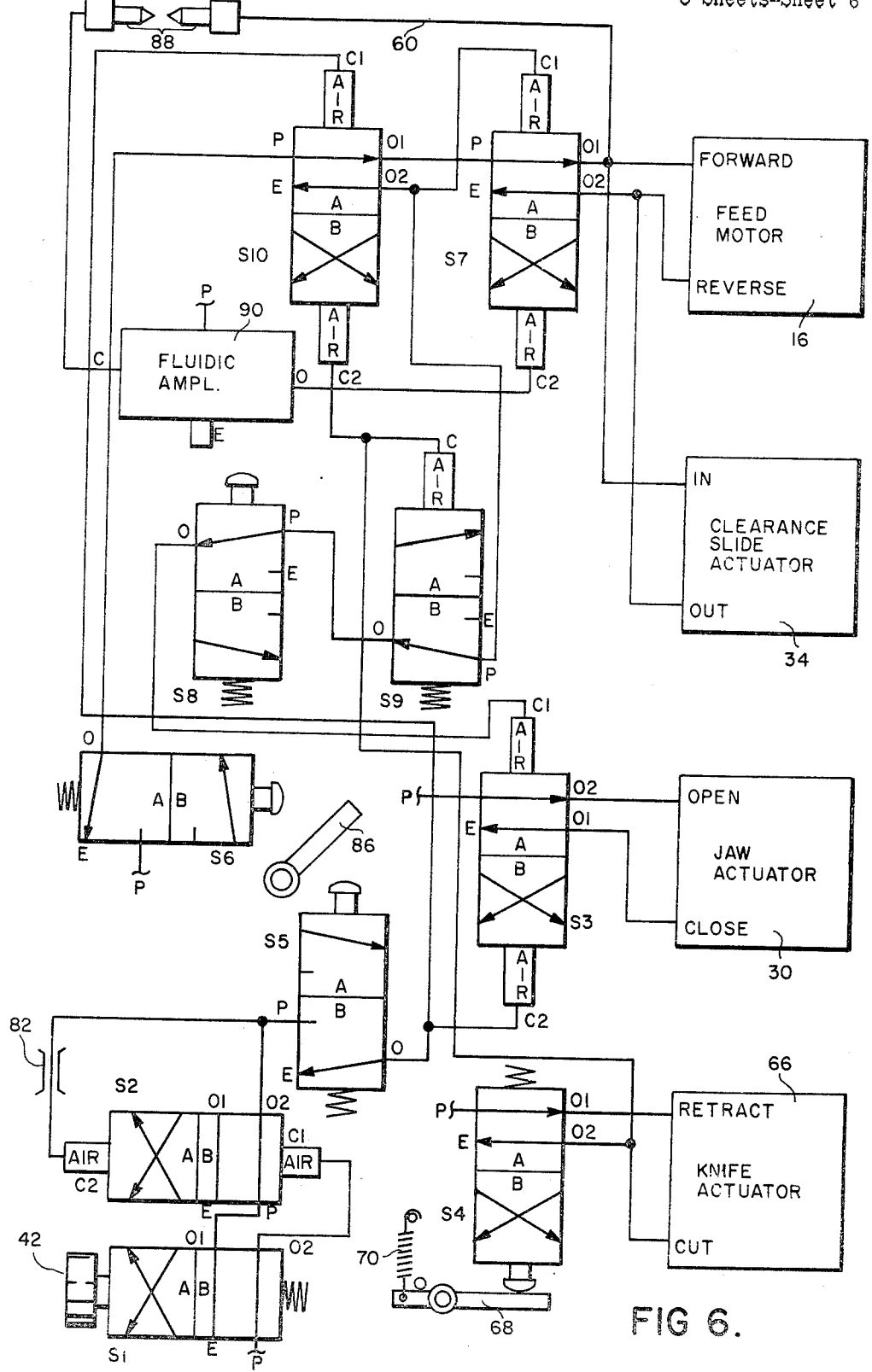
FIG. 6 is a schematic diagram depicting the interconnection of the pneumatic control elements shown in FIG. 3.
Figure 7:
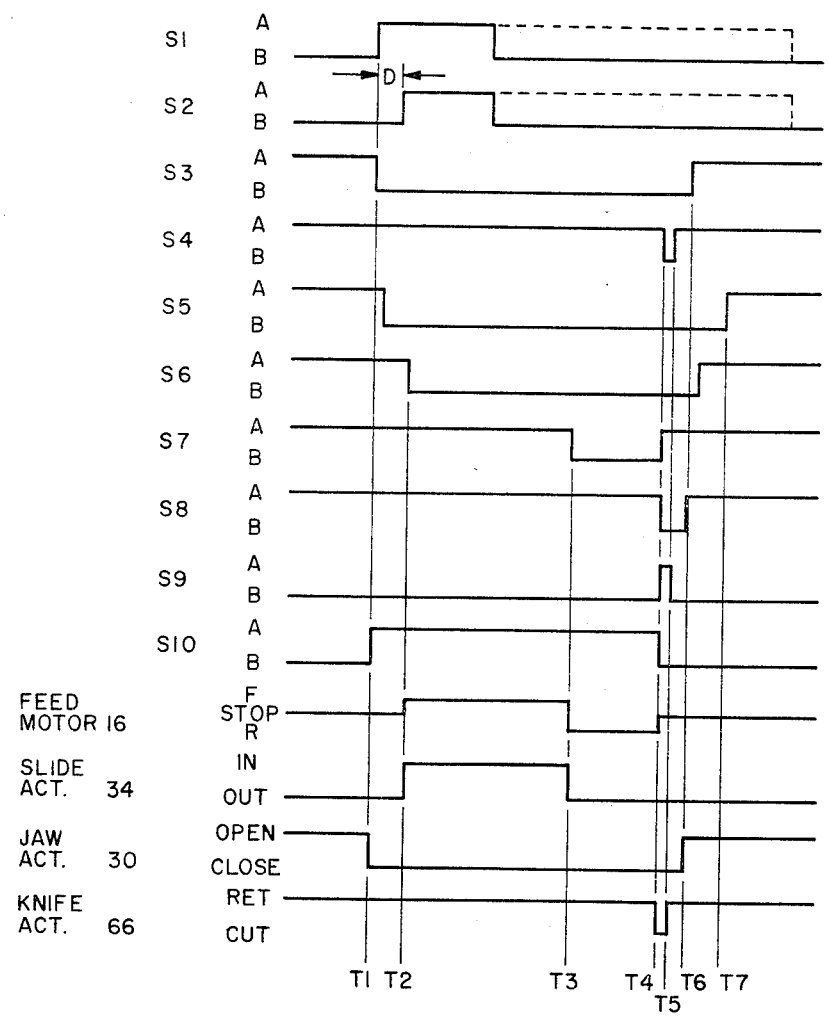
FIG. 7 is a timing diagram showing one cycle in the operation of the control circuit of FIG. 6.

FIG. 6 schematically depicts the motive and control elements of the invention and FIG. 7 is a "waveform" diagram showing the sequence of operation of the various components through one full wrapping cycle. It should be noted that each of the components represented in FIG. 7, with the exception of feed motor 16, have two states. Motor 16 has three states: forward (F), stop and reverse (R). Switches S1 through S10 are shown as having states A and B. In the schematic representation of these switches in FIG. 6, each switch is represented by two boxes A and B. Each box represents the function performed by the switch in the state corresponding to the letter contained in the box. Also, each box is connected to a symbol representing a control input. Manipulation of a control input causes the switch to assume the state represented by the box to which the particular control input is connected. For example, depression of the push-rod actuator of switch S5 places the switch in its A condition whereby input P is connected to output O and exhaust E is blocked off. Release of the actuator causes the schematically represented spring to place the switch in its B state whereby output O is connected to exhaust E and input P is blocked off.

Referring now to FIGS. 6 and 7 operation of the control components of the apparatus through one full wrapping cycle is hereinafter described. Before the beginning of the cycle, the components exist in the state shown at the extreme left of the diagram FIG. 7. That is, switches S1, S2, S9 and S10 are in the B state while switches S3, S4, S5, S6, S7 and S8 are in the A state. Feed motor 16 is in its stop condition, slide actuator 34 is in its "out" condition (meaning that clearance slide 36 is withdrawn from path of the strap), jaw actuator 30 is in its "open" state (meaning that jaw member 28 is fully opened) and the knife actuator 66 is in its "RET" (retracted) state meaning that it is retracted from the cutting position.

To initiate a wrap cycle, the operator depresses start button 42, depressing the actuator of switch S1 and causing that switch to assume state A. This switches the air pressure at input P to output O1 whereupon the same pressure is passed on directly to O2 of S2, feeding input P of S5 and C2 of S2 through restrictor 82. Since jaw 28 is fully opened and S5 is thereby in state A, pressure is passed from input P of S5 to output O, switching S3 to state B and S10 to state A. The switching of S3 to its B state passes air pressure from the P input to the O1 output of S3, thereby causing jaw actuator 30 to begin closing jaw 28. This virtually simultaneous sequence of action is shown in FIG. 7 as occurring at time T1.

Shortly after T1 switch S5 is placed in its B state as arm 86 moves counterclockwise with jaw 28 and a short time after that switch S6 is placed in its B state when the jaw fully closes. This latter action takes place at time T2. As soon as S6 is switched, air pressure is passed to output O thereof and is applied directly to the forward drive input of reversible air motor 16 through switches S10 and S7 which are both in the A state. This initiates the forward feeding of strap 14 into the closed-loop guide and, at the same time, also causes the clearance slide actuator 34, which has it "in" input connected to output O1 of S7, to position clearance slide 36 in the path of the strap so that the end of the strap feeds cleanly past the upper closure detent as it feeds through the closure (FIG. 5a).

Switch S2 provides a special interlock in that it provides protection against retriggering of a new cycle in the event the operator inadvertently holds start button 42 depressed past the end of the cycle. When a cycle is initiated by the transmission of pressure to O2 of S2, the latter is caused by this pressure to switch to its A state at some length of time D (FIG. 7) after T1 as determined by restrictor 82. As soon as S2 switches to its A state, no further pressure can be applied to output O2 until S2 is switched back to its B state by the application of pressure to its control input C1. This cannot be done until S1 is returned to its B state by the releasing of start button 42. Therefore, even though the operator may keep S1 depressed (dashed lines in FIG. 7) until the completion of the wrapping cycle the new cycle cannot be triggered until the operator releases start button 42 and redepresses it. Of course if the opposite error occurs i.e., the operator quickly depresses start button 42 a second time during the same cycle, the cycle will not be interrupted or otherwise affected since S5 must be in its A state in order for a new cycle to begin. As noted from FIG. 7, S5 is not returned to its A state until the very end of the cycle when arm 86 signals that the jaw 28 has been fully opened.

After forward feeding of the strap has begun at T2 the next events occurs after the strap has completely traversed the closed-loop guide and the end has been reinserted through the closure. When the end of the strap interrupts the sensing stream from nozzle 88, fluidic amplifier 90 produces a pulse at its output O which is applied to input C2 of S7, switching the latter to its B state. This switches the pressure at P of S7 from output O1 to output O2 and thus reverses feed motor 16, pulling the strap backwards and closing the loop on the cable bundle. At the same time that reverse feeding is initiated, the pressure at O2 of S7 is also applied to clearance slide actuator 34 to retract slide 36 from the path of the strap. These events are depicted at time T3 of FIG. 7.

After the loop has been closed tightly about the cable bundle tension arm 46 causes arm 68 to pivot counterclockwise against the bias of spring 70, switching S4 from its A state to its B state at time T4. This switches pressure to output O2 of S4 whereupon the knife actuator 66 is operated to first cut the closure from its supply and then to cut the strap from its supply. Operation of actuator 66 also switches S8 to its B state. The same pressure that operates actuator 66 is also applied to input C2 of S10, switching that element to its B state, and to input C of S9 switching that element to its A state. The switching of S10 removes all pressure from feed motor 16 and the motor stops. The pressure at port P of S10 is diverted to output O2 and is applied to the P input of switch S9. However, since S9 has already been switched to its A state, the pressure applied to P of S9 has no immediate effect. However, as soon as the knife has severed the strap, tension arm 46 and arm 68 return to their home position, causing S4 to switch back to its A state. This happens at time T5. This reverses the air supply to knife actuator 66, causing it to retract the knife blade, and removes pressure from the C input to S9 allowing the spring thereof to return S9 to its B state. This latter action applies the pressure at the P input of S9 of the P input of S8. Shortly thereafter, return of the knife blade to its retracted position redepresses the actuator of S8, returning that element to its A state and applying pressure to the C1 input of S3. This occurs at time T6.

The switching of S3 back to its A state reverses the pressure to jaw actuator 30 and the jaw 28 begins to open. An instant thereafter arm 86 releases the actuator of S6 and the latter returns to its A state and shortly after that the actuator of S5 is depressed by the arm and S5 is returned to its A state, signalling completion of the cycle at time T7. As is noted from FIG. 7 all components have been returned to their initial state and the apparatus remains at rest until start button 42 is again depressed to initiate the next cycle.

Figure 8B:
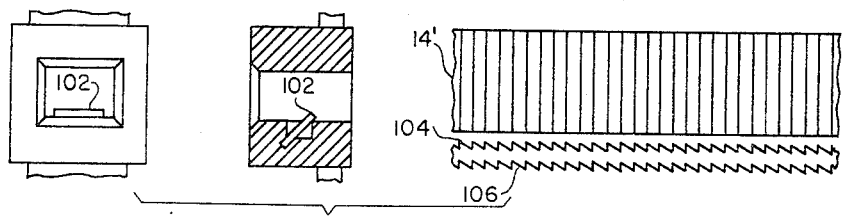

The closure element 18a described above and in connection with FIG. 8a necessitates the use of clearance finger 36 to assure that during forward feeding of the strap the strap end does not catch on the upper detent 96 (FIG. 8a). The need for clearance finger 36 and associated control components may be eliminated from the apparatus by use of different closure-strap configurations, as hereinafter described in connection with FIGS. 8b, 8c and 8d. FIG. 8b shows a closure which is identical to the closure of FIG. 8a except that only a lower anti-reverse detent 102 is employed. This performs the same function as anti-reverse detent 98 of FIG. 8a. The function of the upper detent 96 is performed in the FIG. 8b closure-strap assembly by serrations 104 and 106 provided on the upper and lower surfaces of strap 14'. It can be readily appreciated that after this strap has been inserted in the closure in the manner previously described for the strap 14, reverse feeding of the strap to close the loop on the cable will cause the bottom serrations 106 on the upper layer of strap to ratchet over the top serrations 104 on the lower layer of strap. This action is permitted by the sloped configuration of the teeth of the serrations. However, once the strap has been drawn tight and severed, the serrations 106 of the upper layer lock with the serrations 104 of the lower layer and rightward movement of the upper layer with respect to the lower is prevented by the vertical edges of the teeth. As mentioned above, this closure-strap combination is installable by the above-described apparatus operating exactly as previously described except that the function of clearance slide 36 is not required, resulting in a somewhat simplified apparatus and procedure.

Figure 8C:
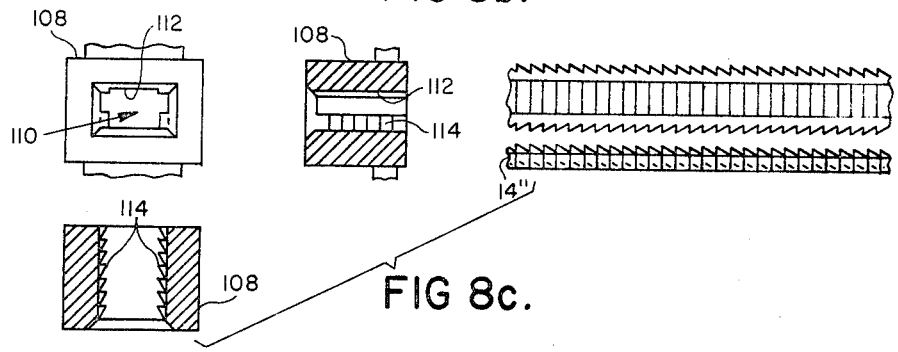

The closure-strap combination shown in FIG. 8c employs no steel anti-reverse detent fingers. The closure includes a block 108 having a central aperture 110 provided with serrations 114 along the lower sidewalls thereof. These serrations, together with mating serrations on the edges of the strap 14" perform the function of the previously described detents 102 and 98. The strap also has teeth on its top and bottom surfaces to perform the same locking function as the top and bottom teeth on the strap 14' of FIG. 8b. During installation, the strap 14" is fed through the enlarged upper portion of aperture 110 with the serrations on the top of the strap passing freely through groove 112 in the upper wall of the aperture. On the second insertion of the strap the edge serrations ratchet over the teeth 114 and the top serrations on the lower layer of strap mate with the bottom serrations on the upper layer of strap. During reverse feeding of the strap to close the loop, these latter two sets of teeth ratchet over one another and the closure teeth 114 perform the anti-reverse detent function to secure the end of the strap in the closure. After the strap has been tightened and severed, a taut inter-connection of the assemblage is maintained through the locking of the top and bottom strap serrations, as previously described for strap 14'.

Figure 8D:
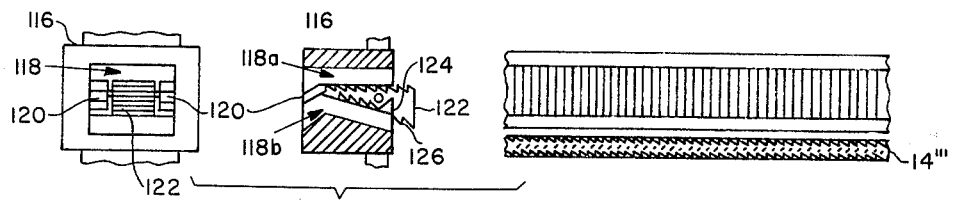

The closure-strap combination shown in FIG. 8d also features a construction which is entirely non-metallic. A block 116 is provided with a central aperture 118 which is divided into an upper passage 118a and a lower passage 118b by a pair of inwardly projecting shoulders 120 between which is connected a serrated wedge member 122. Wedge 122 is secured to the shoulders 120 by thin, easily breakable connector pins. The serrations on wedge 122 do not project into the passages 118a and 188b with the exception of the end teeth 126 on the lower right-hand side of the wedge. Also, the end portion of the wedge is separated from the main body thereof by a groove 124 which permits the end portion to be relatively flexible. The strap 14''' has top and bottom serrations like the previously described strap 14' except that the serrations on strap 14''' are recessed into the strap as shown in FIG. 8d.

Thus, when the strap is fed in the forward direction through the closure, it passes freely through the upper portion 118a of aperture 118 and when it is turned back upon itself to be reinserted it passes through lower aperture portion 118b. As the end of the strap 14''' emerges from the closure for the second time it engages the teeth 126 on the flexible lower right-hand portion of wedge 122. The wedge flexes and the upper strap teeth and the wedge teeth ratchet with respect to each other as the strap completes its forward movement through the closure. When reverse feeding of the strap begins, and the reverse forces tend to pull the lower layer of the strap back through the closure in a leftward direction, the upper strap teeth and the lower wedge teeth 126 lock and further application of leftward forces to the strap causes the wedge to break away from its mounting and to become tightly wedged between the upper and lower strap layers.

When this wedging action occurs the remaining teeth on the wedge mate with the recessed strap teeth and a positive locking anti-reverse arrangement is achieved. Due to the wedging action of this closure design, the tighter the strap is drawn around the cable bundle the better the lock achieved. In the case of all the closures and straps discussed above, a suitable material is "nylon," "Delrin" or "Teflon."

What is claimed is:

1. Strapping apparatus for applying an indeterminate length of plastic strapping around a bundle of electrical conductors and fastening the ends of the strapping by means of a hollow strap closure of the type having a detent therein to hold the ends of the strapping therein comprising, in combination: a support carrying strap guiding relatively movable and openable jaws so that the jaws may be opened to admit said bundle of conductors; a strap closure feed mechanism for automatically feeding said hollow strap closures one at a time into position for receiving the strapping adjacent the jaws; strapping drive and guide means for inserting an end of the strapping through the closure and for feeding strapping therethrough and for guiding said fed-through portion of the strapping around the bundle of electrical conductors and back through the closure for reinsertion therein; and strapping reverse feeding means automatically operable to tighten the strapping about the bundle of electrical conductors.

2. The apparatus set forth in claim 1, further comprising: strapping cutting automatically means operable in response to completion of said reverse feeding for severing said strap adjacent to said closure.

3. The apparatus set forth in claim 1 further comprising strap end detecting means for automatically controlling the strap reverse feeding means.

4. The apparatus set forth in claim 3, further comprising: additional detection means for detecting the application of a predetermined tension to said strap during the tightening thereof about said object; and means operable in response to the detection of said predetermined tension for severing said strap at a point proximate to the point where said strap enters said strap guide.

References Cited

UNITED STATES PATENTS

| | | | |
|---|---|---|---|
| 2,707,430 | 5/1955 | Leslie et al. | 100—30 XR |
| 3,066,599 | 12/1962 | Koehler | 100—30 XR |
| 3,146,695 | 9/1964 | Van de Bilt | 100—4 |
| 3,183,824 | 5/1965 | Cook | 100—26 XR |
| 3,327,618 | 6/1967 | Cook | 100—26 XR |
| 3,360,017 | 12/1967 | Vilcins. | |
| 3,447,447 | 6/1969 | Rutty | 100—26 XR |

FOREIGN PATENTS 1,059,784  11/1953  France.

BILLY J. WILHITE, Primary Examiner

U.S. Cl. X.R.

24—16; 53—198; 100—26, 30, 33